United States Patent
Noritake et al.

(10) Patent No.: US 6,410,358 B1
(45) Date of Patent: Jun. 25, 2002

(54) MANUFACTURING METHOD FOR REFLECTION TYPE LIQUID CRYSTAL DISPLAY

(75) Inventors: Kazuto Noritake, Gifu; Toshifumi Yamaji, Aichi, both of (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 09/615,608

(22) Filed: Jul. 14, 2000

(30) Foreign Application Priority Data

Jul. 14, 1999 (JP) .......................................... 11-200600

(51) Int. Cl.$^7$ ...................... H01L 21/00; H01L 21/84
(52) U.S. Cl. ........................ 438/29; 438/30; 438/43; 438/151
(58) Field of Search .......................... 438/151, 689, 438/734, 29, 30, 43, 42

(56) References Cited

U.S. PATENT DOCUMENTS

| | | | |
|---|---|---|---|
| 5,407,845 A | * 4/1995 | Nasu et al. | 437/40 |
| 5,691,791 A | 11/1997 | Nakamura et al. | |
| 5,796,455 A | 8/1998 | Mizobata et al. | |
| 5,805,252 A | 9/1998 | Shimada et al. | |
| 5,847,789 A | 12/1998 | Nakamura et al. | |
| 5,880,797 A | 3/1999 | Yamada et al. | |
| 6,037,084 A | * 3/2000 | Ting et al. | 430/7 |
| 6,163,405 A | * 12/2000 | Chang et al. | 259/599 |

FOREIGN PATENT DOCUMENTS

| | | |
|---|---|---|
| EP | 0112417 | 7/1984 |
| JP | 11-52402 | * 2/1999 |

OTHER PUBLICATIONS

Patent Abstract of Japanese Patent Laid–Open Publication No. 09179127.
Patent Abstract of Japanese Patent Laid–Open Publication No. 06294954.

* cited by examiner

*Primary Examiner*—Vu A. Le
*Assistant Examiner*—Adam Pyonin
(74) *Attorney, Agent, or Firm*—Cantor Colburn LLP

(57) ABSTRACT

On an insulating substrate (10), there are formed a first gate electrode (11), a gate insulating film (12), a semiconductor film (13), and an interlayer insulating film (15). Above the interlayer insulating film (15), a TFT is formed having a second gate electrode (17) connected to the first gate electrode (11). Then, a photosensitive resin (70) is formed over the entire surface of the extant layers. Subsequently, first exposure (75) is applied using a first mask (71), and second exposure (76) is then applied using a second mask (72) with a larger amount of light than used for the first exposure. The second mask (72) has an opening at a position corresponding to a source (13*s*). Thereafter, the photosensitive resin film (70) is developed thereby forming a contact hole (73) and a recess (74).

9 Claims, 4 Drawing Sheets

MANUFACTURING METHOD FOR REFLECTION TYPE LIQUID CRYSTAL DISPLAY

BACKGROUND OF THE INVENTION

1. Field of the Invention

The present invention relates to a reflection type liquid crystal display.

2. Description of the Related Art

In recent years, a reflection type liquid crystal display (LCD) has been developed in which incident light from an observer side is reflected by a reflective display electrode so that display is observed.

FIG. 2 is a plan view showing a display pixel and nearby area of an example of the above mentioned reflective type LCD. FIG. 3 is a cross sectional view, along the line A—A in FIG. 2, showing manufacturing steps.

As shown in FIG. 2, a TFT is formed in an area close to a crossing point between a gate signal line 51 and a drain signal line 52. The gate signal line 51 includes a gate electrode 11 and supplies a gate signal to a gate, while the drain signal line 52 includes a drain electrode 16 and supplies a drain signal to a drain. The gate 11 of the TFT is connected to the gate signal line 51. The drain 13d is connected to the drain signal line 52, while the source 13s is connected to a reflection display electrode 28.

The reflection display electrode 28 preferably has an uneven surface, rather than an even surface, so that incident light can be reflected in multiple directions. With such an arrangement, the display of the reflection type LCD (Liquid Crystal Display) can be observed from a larger area, so that a larger viewing angle can be ensured.

Referring to FIGS. 3(a) to 3(d), an example of manufacturing steps for the above described reflection type LCD will be described.

Step 1 (FIG. 3(a)): on an insulating substrate 10, there are sequentially formed a first gate electrode 11, a gate insulating film 12, and an active layer 13, wherein the insulating substrate 10 comprises a quartz glass, a non-alkali glass, and so on, the first gate electrode 11 comprises a refractory metal (Cr, Mo, and so on), the gate insulating film 12 comprises a SiN film and a $SiO_2$ film, and the active layer 13 comprises an island-shaped polycrystalline silicon film.

Then, in the active layer 13, there are formed a channel 13c above the first gate electrode 11, and a source 13s and a drain 13d at the respective sides of the channel 13c, wherein the source 13s and the drain 13d are formed through ion implantation.

Further, on the channel 13c, there is formed a stopper insulating film 14, comprising a $SiO_2$ film, as a mask covering the channel 13c for preventing ion intrusion at the time of ion implantation.

Covering the entire surface of the gate insulating film 12, the active layer 13, and the stopper insulating film 14, there is formed an interlayer insulating film 15, comprising laminated $SiO_2$ film, SiN film and $SiO_2$ film.

Then, contact holes 16, 17 are made in the interlayer insulating film 15 at respective positions corresponding to the drain 13d and the source 13s. The contact hole 16, corresponding to the drain 13d, is filled by metal, specifically, by a single Al layer or sequentially laminated Mo and Al layers, thereby forming a drain electrode 18. At the same time of the formation of the drain electrode 18, a second gate electrode 19 is formed on the interlayer insulating film 15 above the channel 13c using metal, specifically, a single Al layer or sequentially laminated Mo and Al layers. Note that nothing is filled in the contact hole 17.

The second gate electrode 19 is connected to the gate signal line 51 on the insulating substrate 10, via a contact hole 20, formed in the gate insulating film 12 and the interlayer insulating film 15 as shown in FIG. 1. A drain signal line 52 is formed on the interlayer insulating film 15.

Step 2 (FIG. 3(b)): a first planarization insulating film 21, made of organic resin, and so on, is formed over the layers formed at Step 1, and a first resist film 22 is applied thereon. Thereafter, exposure and development processes are applied using a first mask 23, which has an opening at a position corresponding to the contact hole 17, followed by etching the first planarization insulating film 21, thereby forming a contact hole 24 corresponding to the contact hole 17.

Step 3 (FIG. 3(c)): a second planarization insulating film 25 is formed on the semiconductor film 13 in the contact hole 24 and the exposed first planarization insulating film 21. A second resist film 26 is then applied on the film 25. Thereafter, exposure and development processes are applied using a second mask 32, which has an opening at a position corresponding to a recess 27 (29) which is to be formed on an area, on the second planarization insulating film 25, where a reflection display electrode 28 is to be formed, and the second planarization insulating film 25 is thereafter etched whereby a concave 29 (27) is formed (FIG. 3(d)).

With the second resist film 26 subsequently removed, a contact hole 24, where the reflection display electrode 28 contacts the source 13s, is formed, and so are concaves 29 (27) in the reflection display electrode formation area. With the above, the reflection display electrode 28 resultantly has an uneven surface. As a result, incident light can be reflected in multiple directions, and a wider viewing angle can thus be achieved.

However, the above described manufacturing method of a reflection type LCD may result in increased costs and labor as it initially requires formation of a contact hole 24 in the first planarization insulating film 21, and then formation of a second planarization insulating film 25 in a different manufacturing step for subsequent formation of a concave 29 (27) therein.

SUMMARY OF THE INVENTION

The present invention aims to provide an efficient method for manufacturing a reflection type LCD having a concave in a reflection film.

According to the present invention, two exposures are applied to a photosensitive resin, using two different masks, before development, whereby two types of concaves each having different depths are formed. This enables reduction of the number of steps in formation of concave with two different depths.

In particular, a concave with one of the two depths is used to constitute a contact hole for connection between a TFT transistor and a reflection film (a reflection electrode) having a size corresponding to a pixel, and a concave with another depth is used as a concave in the reflection electrode.

BRIEF DESCRIPTION OF THE DRAWINGS

The above and other objects, features, and advantages of the present invention will become further apparent from the following description of the preferred embodiment taken in conjunction with the accompanying drawings wherein.

DESCRIPTION OF THE PREFERRED EMBODIMENTS

In the following, a manufacturing method for a reflection type LCD according to the present invention will be described.

Figure 1A:
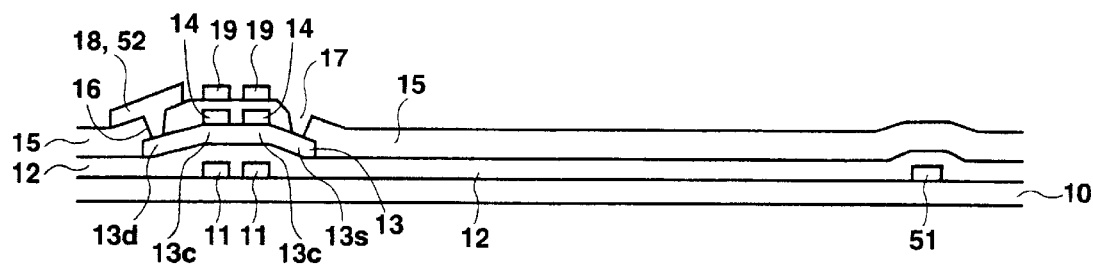
FIGS. 1(a), 1(b), 1(c), 1(d), 1(e) are cross sectional views showing manufacturing steps for a reflection type LCD in a preferred embodiment of the present invention.
Figure 1B:
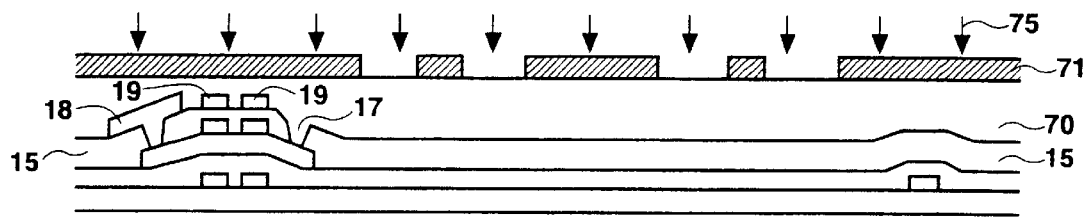
Figure 1C:
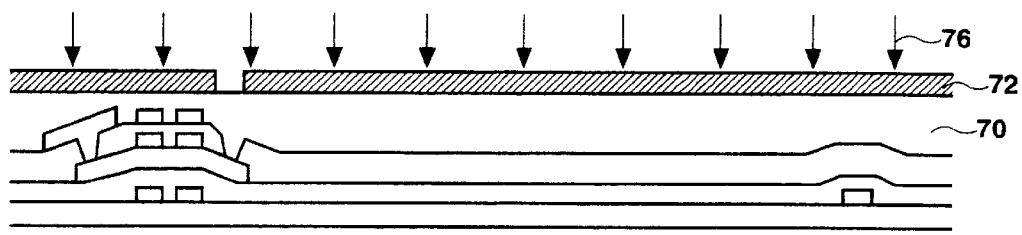
Figure 1D:
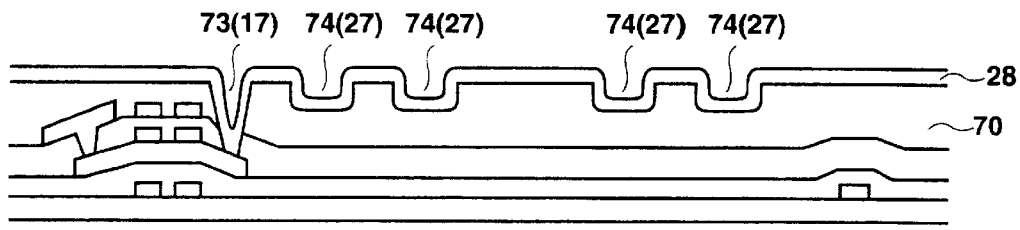
Figure 1E:
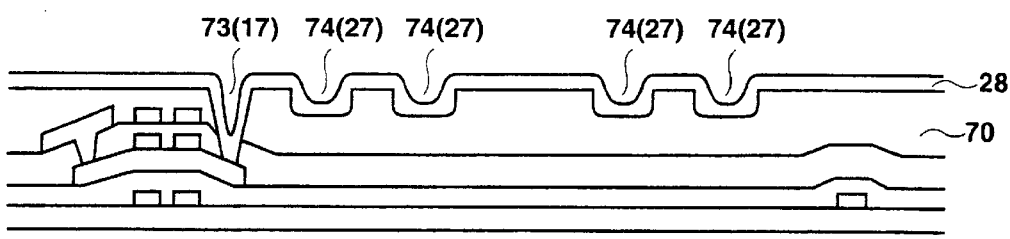
Figure 2:
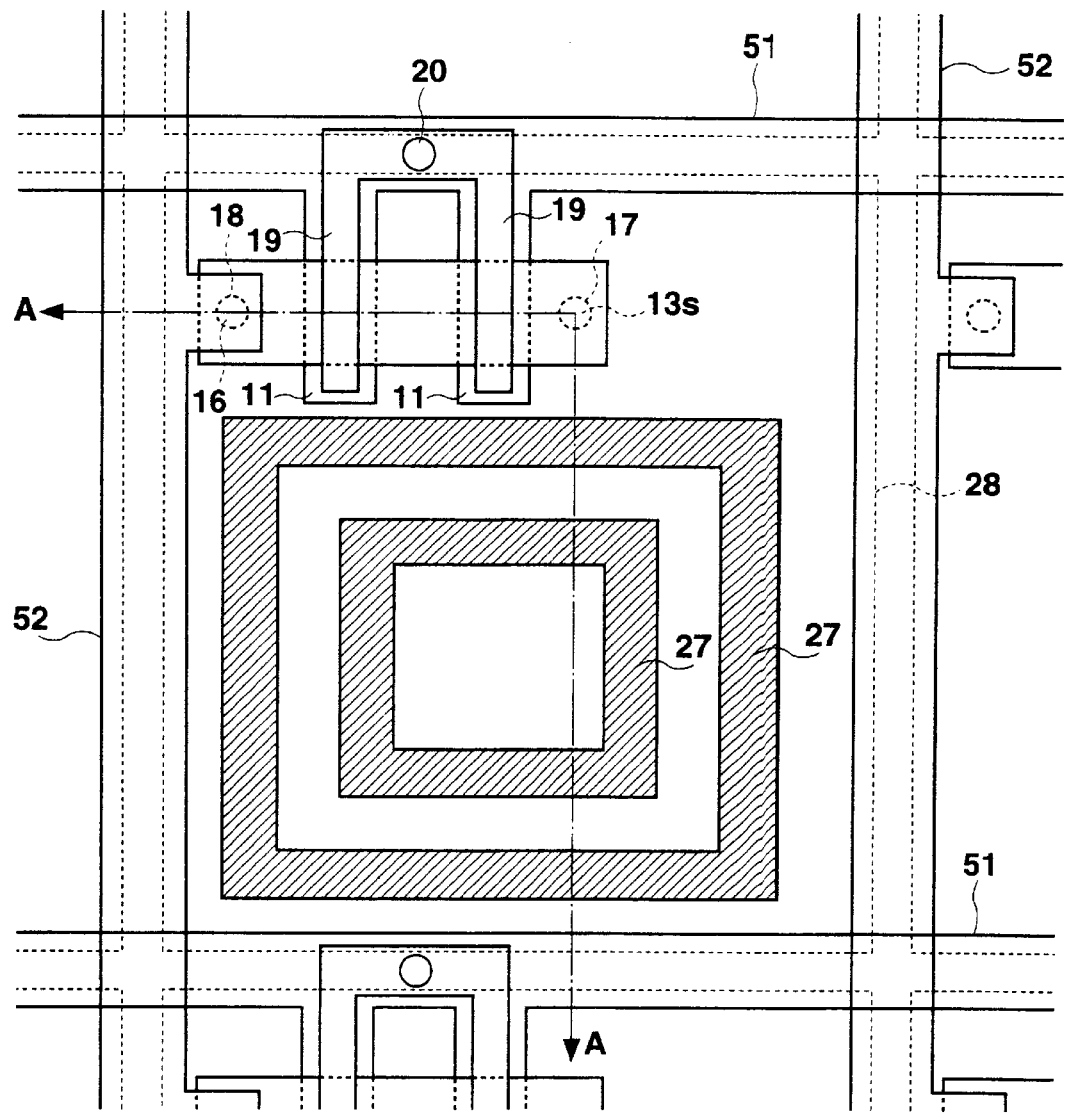
FIG. 2 is a plan view showing a general reflection type LCD.
Figure 3A:
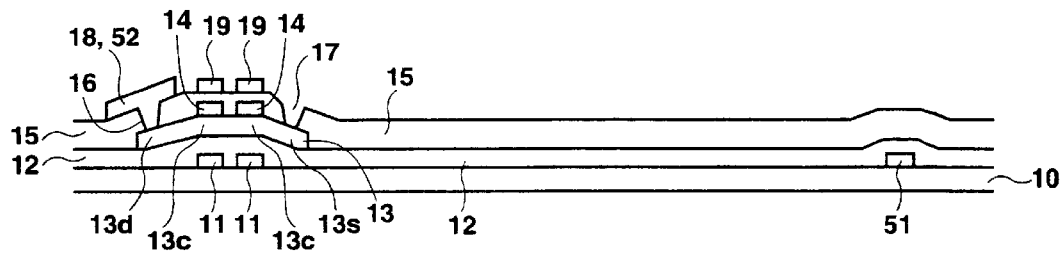
FIGS. 3(a), 3(b), 3(c), 3(d) are cross sectional view showing manufacturing steps for a conventional reflection type LCD.
Figure 3B:
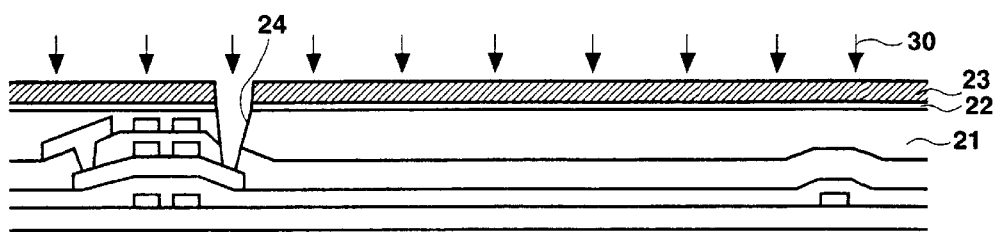
Figure 3C:
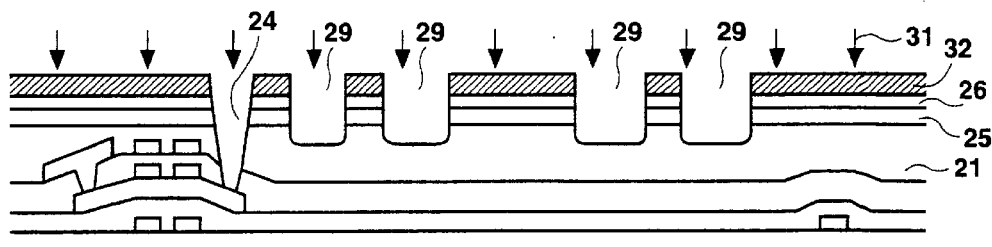
Figure 3D:
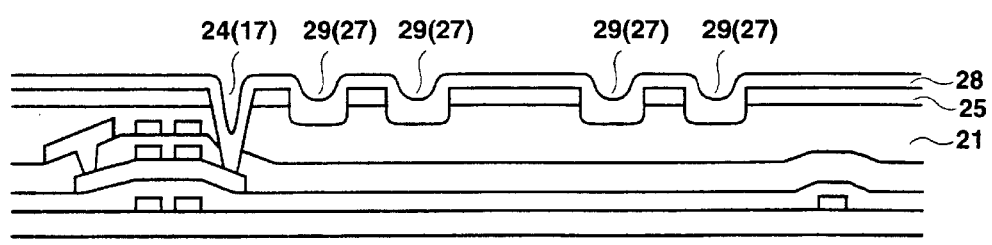

FIGS. 1(a) to 1(e) are cross sectional views, along the line A—A in FIG. 2, showing manufacturing steps for a reflection type LCD of the present invention.

As shown in FIG. 2, a TFT is formed in an area close to a crossing point between a gate signal line 51 and a drain signal line 52. The gate signal line 51 includes a first gate electrode 11, while the drain signal line 52 includes a drain electrode 16. A reflection display electrode 28, which comprises reflection material, is connected to the TFT. The reflection display electrode 28 is provided extending above the TFT, and has a surface with concaves 27 formed thereon.

Step 1 (FIG. 1(a)): on an insulating substrate 10, there are sequentially formed a first gate electrode 11, a gate insulating film 12, and an active layer 13, wherein the insulating substrate 10 comprises a quartz glass, a non-alkali glass, and so on, the first gate electrode 11 constitutes a part of the gate signal line 51 and comprises refractory metal (Cr, Mo, and so on), the gate insulating film 12 comprises a SiN film and a $SiO_2$ film, and the active layer 13 comprises a polycrystalline silicon film.

In the active layer 13, there are formed a channel 13c above the first gate electrode 11, and a source 13s and a drain 13d at the respective sides of the channel 13c. The source 13s and the drain 13d are formed through ion implantation.

On the channel 13c, there is formed a stopper insulating film 14, comprising a $SiO_2$ film, as a mask covering the channel 13c for preventing ion intrusion at the time of ion implantation.

Covering the entire surface of the gate insulating film 12, the active layer 13, and the stopper insulating film 14, there is formed an interlayer insulating film 15, which comprises laminated $SiO_2$ film, SiN film and $SiO_2$ film. The interlayer insulating film 15 may be formed of either a single layer of organic material such as SiO, SiN, acrylic, and so on, or multiple layers of combinations of any thereof.

Then, contact holes 16, 17 are formed in the interlayer insulating film 15 at respective positions corresponding to the drain 13d and the source 13s. The contact hole 16, corresponding to the drain 13d, is filled by metal, specifically, by a single Al layer or sequentially laminated Mo and Al layers, thereby forming a drain electrode 18. At the same time as formation of the drain electrode 18, a second gate electrode 19 is formed on the interlayer insulating film 15 above the channel 13c. That is, a second gate electrode 19 is formed using metal such as a single Al layer or laminated Mo and Al layers.

The second gate electrode 19 is connected to the gate signal line 51 on the insulating substrate 10, via a contact hole 20, formed in the gate insulating film 12 and the interlayer insulating film 15.

A drain signal line 52 is formed on the interlayer insulating film 15 at the same time as formation of the drain electrode 18, which constitutes a part of the drain signal line 52.

Step 2 (FIG. 1(b)): a photosensitive resin film 70, made of insulating resin having photosensitivity and an even surface, is formed over the entire surface of the interlayer insulating film 15, including the contact hole 17, the drain signal line 52, the drain electrode 18, and the second gate electrode 19. Thereafter, a first mask 71 having an opening at a position corresponding to a recess 27 to be formed on an area where a reflection display electrode 28 is to be formed, is placed before first exposure 75 is applied. The amount of exposure is determined such that the light reaches a point at a shallow depth below the surface of the photosensitive resin 70, specifically, 20 $mJ/cm^2$ to 60 $mJ/cm^2$, preferably 25 $mJ/cm^2$ to 50 $mJ/cm^2$, and more preferably 30 $mJ/cm^2$ to 40 $mJ/cm^2$.

Therefore, the term "amount of light" through the specification and claims is defined as "unit exposure light amount" which refers to an amount of light received per unit area of a photosensitive resin film.

Note that specific examples of photosensitive resin may be acrylic resin or polyimide.

Step 3 (FIG. 1(c)): the first mask 71 is removed, and a second mask 72 is placed instead. The second mask 72 has an opening at a position corresponding to a place where a contact hole 73 for connection between the source 13s of the active layer 13 and the reflection display electrode 28 is to be formed.

After the deposition of the second mask 72, second exposure 76 is applied. The amount of the second exposure is larger than that for the first exposure so that a deeper contact hole 73 than the concave 74 can be formed. That is, in order for the exposure light to reach deeper, specifically, deep enough to form a contact hole 73 reaching the source 13s, the amount of second exposure 76 must be large enough, specifically, 200 $mJ/cm^2$ to 600 $mJ/cm^2$, preferably 250 $mJ/cm^2$ to 500 $mJ/cm^2$, more preferably, 300 $mJ/cm^2$ to 400 $mJ/cm^2$.

Step 4 (FIG. 1(d)): after the second mask 72 is removed, the photosensitive resin film 70 is developed whereby a concave 74 and a contact hole 73 are formed.

After the formation of the concave 74 and the contact hole 73 as described above, a reflection display electrode 28, made of reflection material such as Al, is formed thereon. With the above, the contact hole 17 (corresponding to 73 in FIG. 1) and the concave 27 (corresponding to 74 in FIG. 1) are completed.

In addition, an alignment layer for aligning liquid crystal is formed on the reflection display electrode 28. Formation of the alignment film completes a TFT substrate. Then, opposing the TFT substrate, an opposing electrode substrate is formed, which has an opposing electrode and an alignment layer formed on the side thereof having liquid crystal, and a retardation film and a polarizer formed on the other side thereof without liquid crystal (i.e., on the observer side). The TFT substrate and the opposing electrode substrate are attached to each other along the edges thereof and liquid crystal is filled into the space between them, so that a reflection type LCD is completed.

It should be noted that the opposing electrode substrate is substantially transparent, and is not segmented for every pixel.

As described above, the use of photosensitive resin and exposure with the photosensitive resin using different amounts of light for formation of a desired contact hole and a concave, readily enable formation of a contact hole and a concave without the need of two formations of a planarization insulating film, as is conventionally needed. Therefore, the manufacturing process can be simplified, and costs can be reduced.

It should be noted that the present invention is not limited to the above embodiment, in which a concave and a contact hole are formed by development. Moreover, heating at, e.g., about 220° C. after the development would make more gently slanting edges of the concave 74, as shown in FIG. 1(e), so that a brighter display with incident light reflected in many more different directions can be obtained.

Also, the present invention is not limited to the above embodiment, in which concaves 27 are formed as two analogous rectangles formed in a reflection display electrode formation area, and the concave 27 may rather be formed in a circle or in two or more different shapes instead. Moreover, the number of the concave 27 is not limited to two, as described above, and a single concave 27 or three or more concaves 27 may be formed instead.

Further, the area where the concave 27 is formed is not limited to an area enclosed by the gate signal line 51 and the drain signal line 52, and the concave 27 may rather be formed in an area overlapping the gate signal line 51 or the drain signal line 52.

Still further, the present invention is not limited to the above embodiment, in which the circumferential edges of adjacent reflection display electrodes 28 overlap the gate signal line 51 and the drain signal line 52, and the edge may rather overlap either one of the gate signal line 51 and the drain signal line 52 or may even not overlap the signal line. Yet further, the reflection display electrode 28 may not extend over the TFT.

Moreover, the insulating film between the second gate electrode 17 and the active layer 13, i.e., the stopper insulating film 14, the interlayer insulating film 15, and the planarization insulating film 19 in this embodiment, may each be constituted of a single SiO, SiN, or any organic film, or a laminated combination thereof.

Also, instead of the above described TFT having a double gate electrode structure, having two gates, a single gate structure, having one gate, or a multiple gate structure, having two or more gates, may be similarly applicable.

Figure 4A:
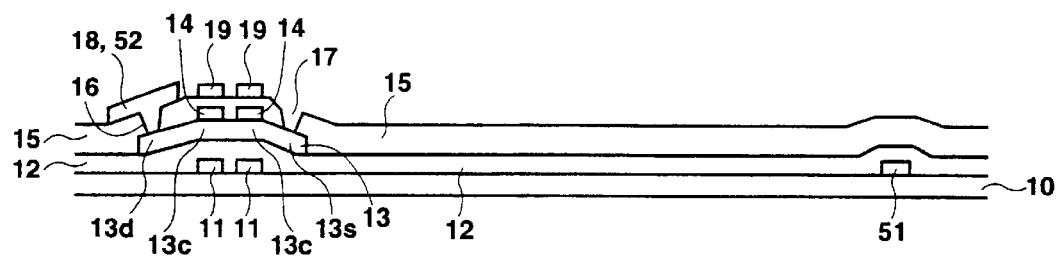
FIGS. 4(a), 4(b), 4(c), 4(d), 4(e) are cross sectional view showing manufacturing steps for a reflection type LCD in another preferred embodiment of the present invention.
Figure 4B:
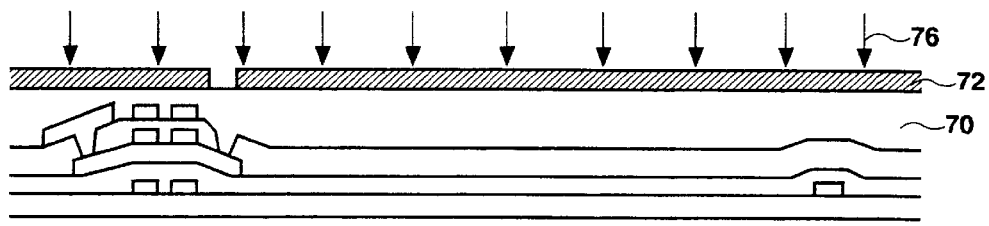
Figure 4C:
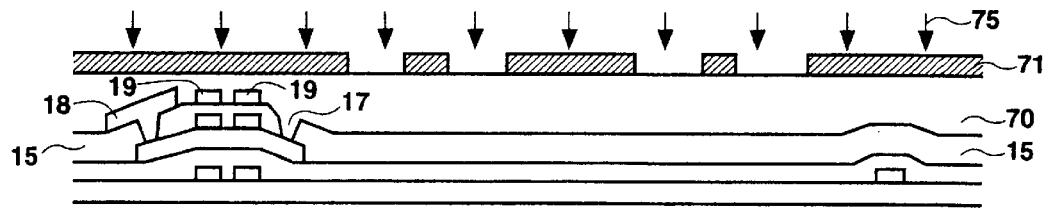
Figure 4D:
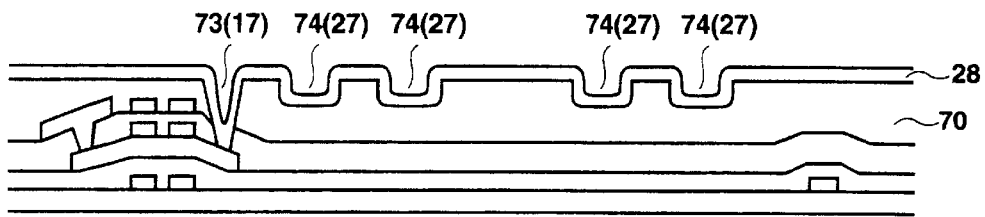
Figure 4E:
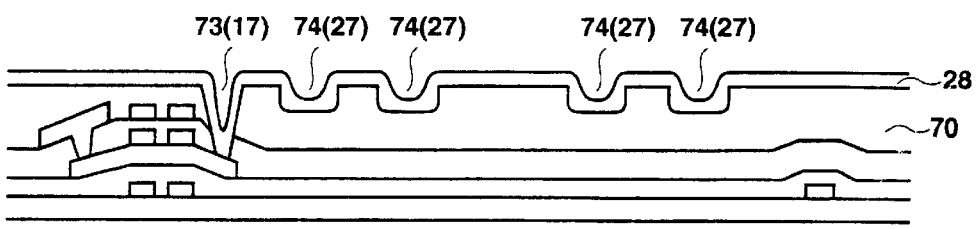

The order of formation of the contact hole 72 and the recess 74 may be reversed from that shown in FIGS. 1(a) to 1(e), into that shown in FIGS. 4(a) to 4(e). With the reversed order, exposure for formation of the contact hole 73, as shown in FIG. 4(b), is initially applied, followed by exposure for formation of the recess 74, as shown in FIG. 4(c). In this case, FIGS. 4(a), 4(d), 4(e) are identical to FIGS. 1(a), 1(d), 1(e), FIG. 4(b) is identical to FIG. 1(c), and FIG. 4(c) is identical to FIG. 1(b).

As described above, according to the present invention, the number of formation steps may be reduced to readily attain contact between the reflection display electrode and the source, while a recess can be formed in a reflection display electrode formation area.

What is claimed is:

1. A manufacturing method for a reflection type liquid crystal display having a reflection film for reflecting light having passed through a liquid crystal layer, the method comprising:

forming a thin film transistor on a substrate;

forming a photosensitive resin film on the thin film transistor;

exposing the photosensitive resin film with a first unit exposure light amount via a first mask;

exposing the photosensitive resin film with a second unit exposure light amount via a second mask;

developing the photosensitive resin film subjected to two exposures thereby forming two types of concaves having different depths; and forming a film using a reflective material on the photosensitive resin developed to have two types of concaves, thereby forming the reflection film;

wherein the photosensitive resin film constitutes an insulating film, the reflection film is a reflection electrode having a size corresponding to a pixel, and the reflection electrode is electrically connected to the thin film transistor, and wherein the first unit exposure light amount is larger than the second unit exposure light amount, the concave formed using the first mask constitutes a contact hole for electrically connecting the reflection electrode and the thin film transistor, and the concave formed using the second mask constitutes a concave formed on a surface of the reflection electrode.

2. A manufacturing method according to claim 1, further comprising heating the photosensitive resin film to give edges of the concave a gentler slope after developing the photosensitive resin film.

3. A manufacturing method for a reflection type liquid crystal display having a reflection film for reflecting light having passed through a liquid crystal layer, the method comprising:

forming a thin film transistor on a substrate;

forming a photosensitive resin film on the thin film transistor;

exposing the photosensitive resin film with a first unit exposure light amount via a first mask;

exposing the photosensitive resin film with a second unit exposure light amount via a second mask;

developing the photosensitive resin film subjected to two exposures thereby forming two types of concaves having different depths; and forming a film using a reflective material on the photosensitive resin developed to have two types of concaves, thereby forming the reflection film;

wherein the photosensitive resin film constitutes an insulating film, the reflection film is a reflection electrode having a size corresponding to a pixel, and the reflection electrode is electrically connected to the thin film transistor, and wherein the second unit exposure light amount is larger than the first unit exposure light amount, the concave formed using the first mask constitutes a concave formed on a surface of the reflection electrode, and the concave formed using the second mask constitutes a contact hole for electrically connecting the reflection electrode and the thin film transistor.

4. A manufacturing method according to claim 3, further comprising heating the photosensitive resin film to give edges of the concave a gentler slope after developing the photosensitive resin film.

5. A manufacturing method for a reflection type liquid crystal display having a plurality of reflection electrodes for reflecting light having passed through a liquid crystal layer, the method comprising:
- forming a lower conductive film on a substrate;
- forming a photosensitive resin film on a thin film transistor;
- exposing the photosensitive resin film with a first unit exposure light amount via a first mask and exposing the photosensitive resin film with a second unit exposure light amount which is greater than the first unit exposure light amount via a second mask at a different timing;
- developing the photosensitive resin film subjected to two exposures to simultaneously form a contact hole and a concave on a surface; and
- forming a film using a reflective material on the photosensitive resin film to thereby form the reflection electrodes;
- wherein the reflection electrodes connect with the lower conductive film via the contact hole and have a concave on a surface due to the concave of the photosensitive resin film.

6. A manufacturing method according to claim 5, wherein the thin film transistor is formed on the substrate, and the lower conductive film constitutes the thin film transistor.

7. A manufacturing method according to claim 5, further comprising heating the photosensitive resin film to give edges of the concave a gentler slope after developing the photosensitive resin film.

8. A manufacturing method according to claim 5, wherein the exposing the photosensitive resin film with the first unit exposure light amount is performed in advance of the exposing the photosensitive resin film with the second unit exposure light amount.

9. A manufacturing method according to claim 5, wherein the exposing the photosensitive resin film with the second unit exposure light amount is performed in advance of the step of exposing the photosensitive resin film with the first unit exposure light amount.

* * * * *

Adverse Decision in Interference

Patent No. 6,410,358, Kazuto Noritake, Toshifumi Yamaji, MANUFACTURING METHOD FOR REFLECTION TYPE LIQUID CRYSTAL DISPLAY, Interference No. 105,357, final judgment adverse to the patentees rendered, January 13, 2006, as to claims 1-9.

*(Official Gazette April 18, 2006)*